United States Patent [19]
Uesugi et al.

[11] Patent Number: 5,104,227
[45] Date of Patent: * Apr. 14, 1992

[54] APPARATUS FOR MEASURING THREE-DIMENSIONAL CURVED SURFACE SHAPES

[75] Inventors: Mitsuaki Uesugi; Masaichi Inomata, both of Kanagawa, Japan

[73] Assignee: NKK Corporation, Tokyo, Japan

[*] Notice: The portion of the term of this patent subsequent to Apr. 7, 2009 has been disclaimed.

[21] Appl. No.: 496,217

[22] Filed: Mar. 20, 1990

[30] Foreign Application Priority Data

Apr. 5, 1989 [JP] Japan ................................. 1-84875

[51] Int. Cl.⁵ .............................................. G01B 11/24
[52] U.S. Cl. ............................................................. 356/376
[58] Field of Search ........................................... 356/376

[56] References Cited

U.S. PATENT DOCUMENTS 4,472,056 9/1984 Nakagawa et al. ................. 356/398
4,794,262 12/1988 Sato et al. ............................ 250/560

OTHER PUBLICATIONS

"Handbook for Image Processing" (published by Shokodo Co.) Jun. 8, 1987.

Primary Examiner—Richard A. Rosenberger
Attorney, Agent, or Firm—Michael N. Meller

[57] ABSTRACT

A three-dimensional curved surface shape measuring apparatus of the slit light rotating type. In accordance with a composite image $\theta(x', y')$ produced when a slit light is rotationally scanned with respect to a picture of an object to be measured and horizontal displacements $x_o$ and vertical displacement $z_o$ of an axis of rotation of the slit light with respect to an origin of a reference plane, a necessary computational processing is performed to determine a three-dimensional shape $f(x, y)$ of the object surface which is free of distortion due to a perspective effect of a television camera.

3 Claims, 3 Drawing Sheets

APPARATUS FOR MEASURING THREE-DIMENSIONAL CURVED SURFACE SHAPES

BACKGROUND OF THE INVENTION

The present invention relates to an apparatus for measuring three-dimensional curved surface shapes in a non-contact manner and more particularly to compensation for distortions due to the perspective effect of a television camera.

A three-dimensional curved surface shape measuring method of this type, proposed in U.S. patent application Ser. No. 259,037 the contents of which are incorporated by reference herein, comprises the steps of scanning a linear slit light all over the surface of an object to be measured while rotating the slit light, forming a composite image in which the value of each of picture elements within a picture of a video signal produced by picking up the surface of the object is represented by information relating to the angle of the slit light at the instant that the slit light passes through one of the positions on the object surface corresponding to each picture element and processing the composite image to measure the three-dimensional curved surface shape of the object to be measured.

However, this shape computing method is based on the tacit assumption that the distance between the television camera and the object to be measured is infinitely great or can be considered to be infinitely great. Where the distance between the television camera and the object to be measured is finite and the perspective effect cannot be ignored when observing the object from the television camera as in the actual measuring system, there is a disadvantage that if this shape computing method is applied as such, distortions due to the perspective effect are caused in the shape measurement result obtained.

SUMMARY OF THE INVENTION

It is an object of the present invention to provide a three-dimensional curved surface shape measuring apparatus which is capable of eliminating any distortions due to the perspective effect of a television camera.

The three-dimensional curved surface shape measuring apparatus according to the present invention is directed to measuring apparatus of the slit light rotating type. Thus, in accordance with a composite image (x', y') produced when a slit light is scanned over the picture of an object to be measured as well as horizontal displacements $x_o$ and vertical displacements $z_o$ of the axis of rotation of the slit light with respect to the origin of a reference plane, the necessary computational processing is performed to determine the three-dimensional shape $f(x,y)$ of the surface of the object which is free of any distortions due to the perspective effect of a television camera.

DESCRIPTION OF THE PREFERRED EMBODIMENTS

With a view to facilitating understanding of the embodiments of the present invention, the apparatus disclosed in U.S. patent application Ser. No. 259,037 will be described briefly before describing the present invention.

Figure 1:
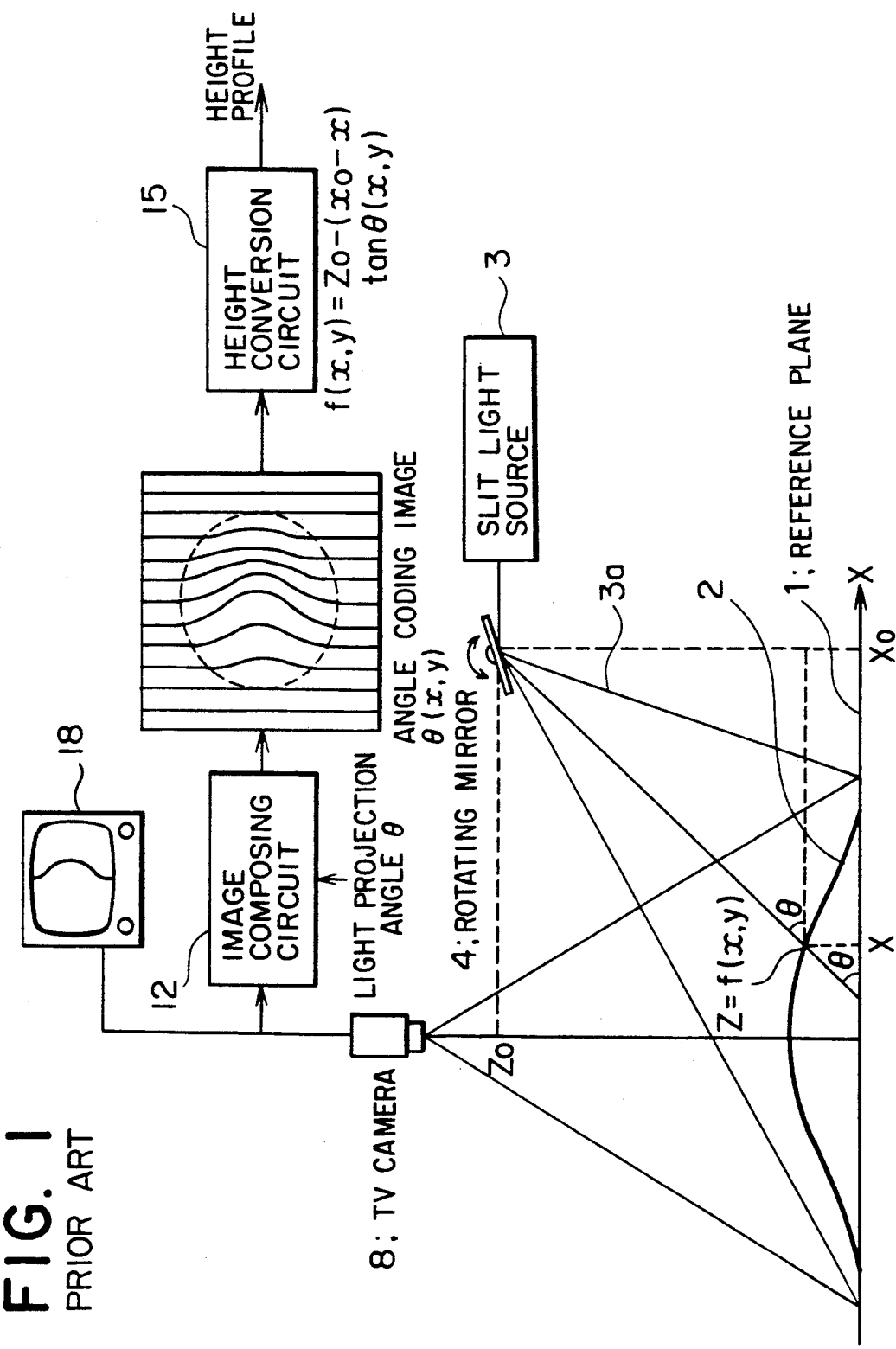
FIG. 1 is a schematic diagram showing the measuring principle of the three-dimensional shape measuring apparatus of the slit light rotating type disclosed in U.S. patent application Ser. No. 259,037.

FIG. 1 is a schematic diagram showing the measuring principle of the three-dimensional curved surface shape measuring apparatus of the slit light rotating type disclosed in U.S. patent application Ser. No. 259,037. A slit light 3a spreading vertically to the paper plane is projected obliquely from above onto the surface of an object 2 to be measured which is placed on a reference plane 1, and the object 2 is picked up by a television camera 8 from, for example, just above the object 2 while moving the slit light transversely to the paper plane by means, for example, of a rotating mirror 4. At this time, the manner in which the linear reflected pattern of the slit light on the object surface is moved transversely in the picture is observed on a monitor television 18 connected to the television camera 8.

The linear shape of the reflected pattern of the slit light 3a reflects the irregularity information of the object surface. In accordance with the video signal generated from the television camera 8 which picks up the manner in which the linear reflected pattern of the slit light 3a is moved over the object surface, a composite image is produced in which the value of each of the picture elements within the picture represents the slit light projection angle at the instant that the slit light passes through the position on the object surface corresponding to that picture element.

The thus-produced image is such that the value of each of the picture elements corresponds to the angle of elevation obtained when the center of the slit light rotation of the rotating mirror 4 is projected from the position on the object surface corresponding to that picture element. As a result, if the composite image is represented in terms of (x,y) by using the coordinate system (x,y) of the corresponding object surface, the profile $f(x,y)$ of the object surface can be obtained from the following equation by a simple geometrical calculation based on FIG. 1.

$$f(x,y) = z_o - (x_o - x)\tan\theta(x,y)$$

However, this shape computing method is disadvantageous in that where the perspective effect of the television camera cannot be ignored as mentioned previously, distortions due to the perspective effect are caused in the shape measurement result obtained.

This disadvantage will be described with reference to FIG. 2 FIG. 2 corresponds to the measuring method of the slit light rotating scanning type shown in FIG. 1. Where the perspective effect of the television camera is not negligible, the application as such of the shape computational expression disclosed in U.S. patent application Ser. No. 259,037, $f(x,y) = z_o - (x - x_o)\tan\theta(x,y)$, causes x or the coordinate x of a point A in FIG. 2 to be regarded as x' and therefore the following two attributive distorted are caused.

(1) The height distortion: While the height z of the point A should properly be measured, what is measured is the height z' of a point A' which is the intersecting point between the slit light plane and the perpendicular drawn from the reference plane at the image point B' of the point A on the reference plane.

(2) The position distortion: While the coordinate x of the point A on the reference plane should properly be the coordinate x of the point B, it is regarded as if the coordinate x of the point B' and the coordinate x' varies in dependence on the height of the point A.

The background of the present invention has been made clear by the foregoing description and the distortion compensating method according to the present invention will now be described.

(1) The Height Distortion Compensation

Figure 2:
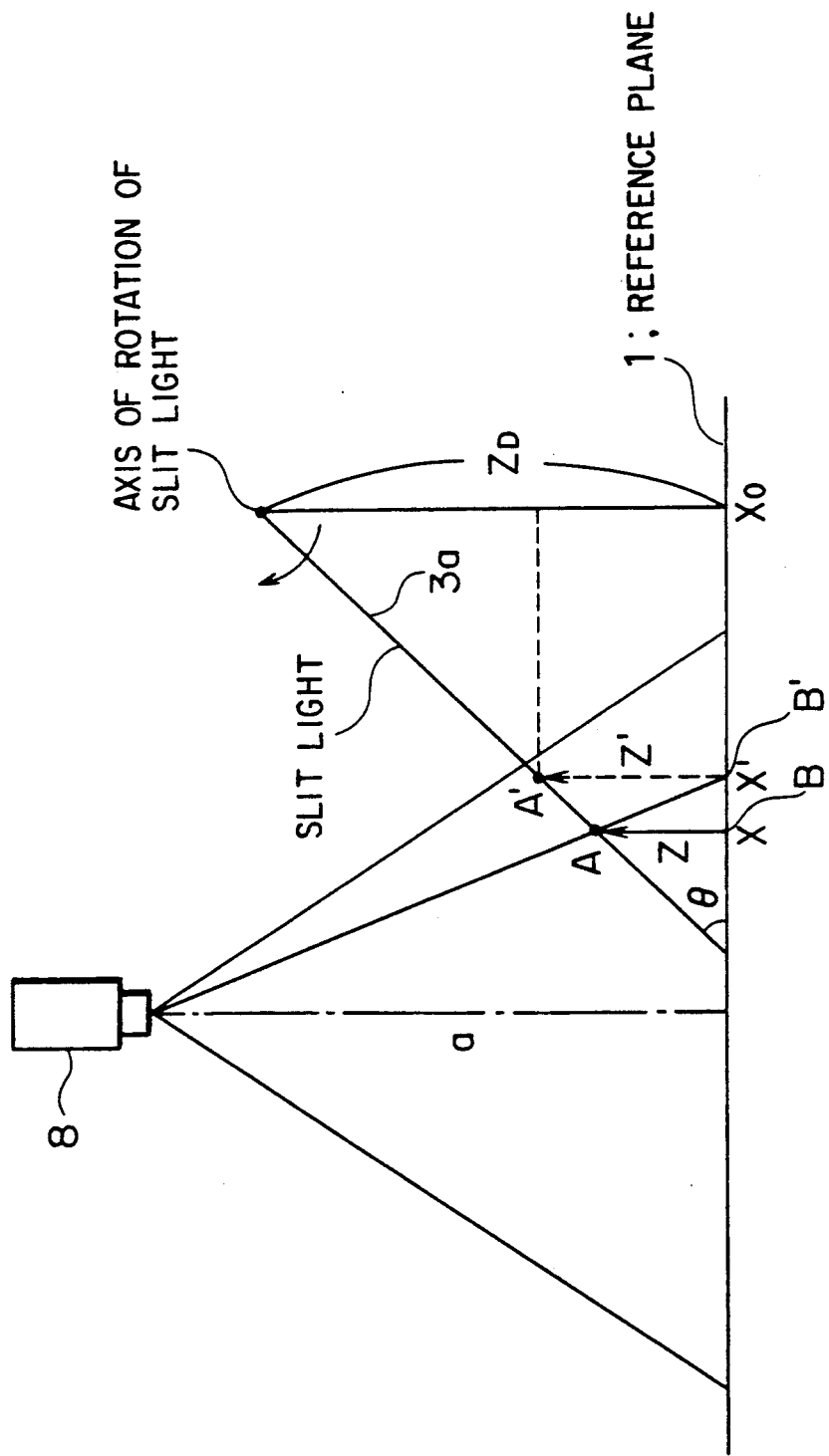
FIG. 2 is a diagram useful for explaining the distortions in the measurement of the shape measuring method of the slit light rotating scanning type and a compensating method for the distortions.

The height z of the point A in FIG. 2 is given by the following expression from the Figure:

$$z = z_0 - (x_0 - x)\tan\theta \qquad (1)$$

However, the point of projection of the point A on the reference plane is the point B' and consequently the height of the point A is outputted as follows in accordance with the conventional method.

$$z' = z_0 - (x_0 - x')\tan\theta \qquad (2)$$

To provide compensation for this distortion, it is only necessary that the proper coordinate x of the point A on the reference plane can be computed from the actually observed projective coordinate x' of the point A on the reference plane. The relation between x' and x is determined in the form of the following equation (3) by a simple geometrical calculation from FIG. 2. (a=the reference plane-television camera distance).

$$x = (x - a/z)x' \qquad (3)$$

By substituting equation (3) in equation (1) and simplifying it, the height z of the point A is obtained in the form of the following equation.

$$z = \frac{z_0 - (x_0 - x')\tan\theta}{1 + \frac{x'}{a}\tan\theta} \qquad (4)$$

In equation (4), $x_0$ corresponds to the composite image $u(x', y')$ produced by scanning the slit light over the surface of the object to be measured and x' corresponds to the composite image $u_0(x', y')$ with respect to the reference plane. Thus, equation (4) can be easily generalized and the shape computational expression compensated for the height distortion can be obtained in the form of the following equation.

$$z(x', y') = \frac{z_0 - (x_0 - x')\tan\theta (x', y')}{1 + \frac{x'}{a}\tan\theta (x', y')} \qquad (5)$$

(2) The Position Distortion Compensation

Although the true height of the point A has been determined by equation (5), the position coordinates of the point A are the coordinates (x', y') of the projective point B' of the point A on the reference plane centering the camera lens and not the coordinates (x, y) of the projective point B of the point A in the rectangular coordinate system.

This coordinates distortion can be compensated for by the following equations as will be readily seen from FIG. 2.

$$x = \left(1 - \frac{z(x', y')}{a}\right)x' \qquad (6)$$

$$y = \left(1 - \frac{z(x', y')}{a}\right)y' \qquad (7)$$

(3) The Shape Computational Expression

By using the above-mentioned height and position distortion compensating expressions (5), (6) and (7) and considering the compensation for the perspective effect of the camera, the shape computational expression for the three-dimensional shape f(x, y) of the surface of the object to be measured can be given by the following equation $$f(x, y) = z(x', y') \qquad (8)$$

Figure 3:
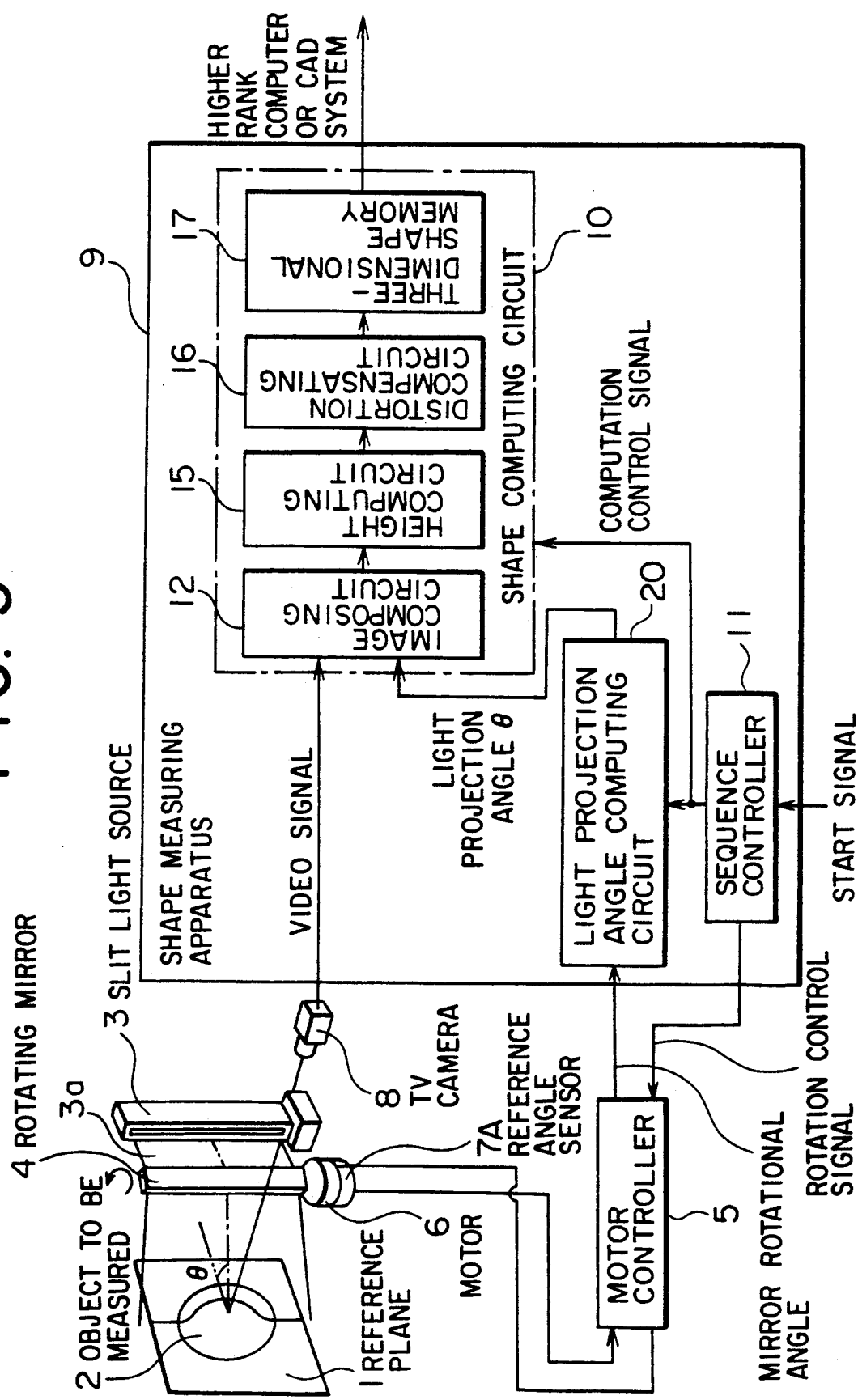
FIG. 3 is a schematic block diagram showing the construction of a three-dimensional shape measuring apparatus of the slit light rotating scanning type according to an embodiment of the present invention.

FIG. 3 a schematic block diagram showing the construction of a three-dimensional shape measuring apparatus of the slit light rotating scanning type according to an embodiment of the present invention. An object 2 to be measured is placed on a reference plane 1 serving as a basis for measurement. A slit light 3a emitted from a slit light source 3 is reflected by a rotating mirror 4 and projected onto the object 2 obliquely from above. The rotating mirror 4 is driven by a motor 6 which is controlled by a motor controller 5 so that the rotating mirror 4 is driven to cause the slit light 3a to scan all over the surface of the object 2 on the reference plane 1.

At this time, it is assumed that the position ($x_0$, $z_0$) of the central axis of rotation of the rotating mirror 4 relative to the reference plane 1 is measured accurately. Also, it is so arranged that the angle formed by the rotating mirror 4 with the reference plane 1 is detected by a rotation angle sensor 7A operatively mounted on the shaft of the motor 6, and the angle is applied through the motor controller 5 to a shape measuring apparatus 9, thereby computing the slit light projection angle $\theta$ varying from moment to moment with respect to the object 2 to be measured.

On the other hand, the surface of the object 2 is picked up by a television camera 8 arranged so that its optical axis crosses the reference plane 1 at right angles and the resulting video signal is applied to the shape measuring apparatus 9.

The shape measuring apparatus 9 comprises mainly a shape computing circuit 10 serving as image computing means for performing a shape computation by image composing, a light projection angle computing circuit 20 for computing a slit light projection angle $\theta$ from the output of the rotation angle sensor 7A and applying it to the shape computing circuit 10, and a sequence controller 11 for applying commands to the motor controller 5 and controlling the timing of computation of the shape computing circuit 10.

During the shape measurement, the shape measuring apparatus 9 drives the motor 6 through the sequence controller 11 in response to the externally applied start signal and the rotating mirror 4 is set in its initial position. Thereafter, the rotation of the rotating mirror 4 is started, thereby starting the scanning of the slit light 3a.

The shape computing circuit 10 includes in its input section an image composing circuit 12 which will be described later so that at the same time that the scanning of the slit light source 3 is started, the video signal applied from the television camera 8 is processed from moment to moment so that during one scanning period of the slit light 3a an image composing computation is performed in which the value of each of the picture elements within the picture is represented by a light projection angle read from the light projection angle computing circuit 20 at the instant that the slit light passes through that picture element.

After the computation of the composite image $\theta(x', y')$ has been completed, in reponse to the command from the sequence controller 11 the computation of a the-dimensional shape data $z(x', y')$ is performed by means of a height computing circuit 15 in accordance with equation (5). Then, a distortion compensating circuit 16 provides compensation for the distortions in accordance with equations (6), (7) and (8) and the resulting height profile data $f(x, y)$ is stored in a three-dimensional shape memory 17.

In response to the command from a higher rank computer or a CAD system, the height profile data stored in the three-dimensional shape memory 17 is suitably transferred to the higher rank computer or the CAD system.

It is to be noted that while, in the above-described embodiment of FIG. 3, the light projection angle $\theta$ is directly used as a composing signal in the image composing circuit 12, assuming for example that the rotating mirror is rotated at a uniform rate, any quantity corresponding to the light projection angle $\theta$, e.g., the elapsed time since the starting of the rotation, can be used and the light projection angle itself need not be used particularly. In this case, however, a light projection angle conversion circuit must be provided after the image composing circuit 12. Further, the light projection angle $\theta$ is always used only in the form of its tangent tan $\theta$ and therefore the image composing circuit 12 may produce a composite image in terms of the tangents tan $\theta$ in place of the light projection angles $\theta$.

What is claimed:

1. In a three-dimensional curved surface shape measuring apparatus for rotating a linear slit light within a plane of said slit light beam relative to a picture of an object to be measured and about an axis of rotation comprising a straight line parallel to a reference plane to scan said slit light all over a surface of said object to be measured, measuring projection angles of said slit light, picking up the picture of said object to be measured by a television camera from a direction different from the direction of projection of said slit light, processing video signals from said television camera with respect to each of image elements to form a composite image in which a value of each of picture elements within the picture is represented by a light projection angle, or a value equivalent thereto and performing a computational processing on the basis of said composite image;
said three-dimensional curved surface shape measuring apparatus comprising;
shape computing means which includes:
a height computing circuit for determining a height $z(x', y')$ of said object in accordance with said composite image $\theta(x', y')$ produced when said slit light is scanned over the surface of said object and horizontal displacement $x_o$ and vertical displacements $z_O$ of the axis of rotation of said slit light with respect to an origin of said reference plane;
distortion compensating means for compensating two-dimensional coordinates $(x', y')$ of said height data $z(x', y')$ produced by said height computing circuit in accordance with said height data $z(x', y')$, and a distance a between said reference plane and said television camera; and
memory means for storing said height data z subjected to said two-dimensional coordinates compensated by said distortion compensating means as three-dimensional shape data of said object.

2. A three-dimensional curved surface shape measuring apparatus as in claim 1, wherein said shape computing means determines said three-dimensional curved surface shape of said object to be measured in accordance with the following equations:

$$f(x, y) = z(x', y')$$

$$z(x', y') = \frac{z_0 - (x_0 - x') \tan \theta (x', y')}{1 + \frac{x'}{a} \tan \theta (x', y')}$$

$$x = \left(1 - \frac{z(x', y')}{a}\right) x'$$

$$y = \left(1 - \frac{z(x', y')}{a}\right) y'$$

wherein a is the distance between said reference plans and the television camera,
$\theta(x', y')$ is said composite image data,
$(x', y')$ is the coordinate system before the distortion of position of each image element of said composite image has been rectified,
$(x, y)$ is the coordinate system after said distortion has been rectified.
$z(x', y')$ is the three-dimensional shape before said distortion of position has been rectified, and
$f(x, y)$ is the three-dimensional shape data after said distortion of position has been rectified.

3. A measuring apparatus as in claim 1, further comprising:
slit light projecting means for projecting said linear slit light onto the picture of said object to be measured;
slit light rotating scanning means for rotating said slit light projecting means for rotating said slit light projecting means within a plane of said slit light beam and about an axis of rotation comprising a straight lines parallel to said reference plane to scan said slit light all over the surface of said object to be measured;
slit light angle measuring means for measuring light projection angles of said slit light;
a television camera for picking up the surface of said object from a direction different from said slit light projecting means; and
image composing means for processing a video signal from said television camera to form a composite image in which the value of each of picture elements within a picture is represented by a light projection angle read from said slit light angle measuring means at an instant that said slit light passes through one of positions on the picture of said object corresponding to each said picture element or a value equivalent thereto.

* * * * *